UNITED STATES PATENT OFFICE.

JACOB WELTI, OF NEW YORK, N. Y., ASSIGNOR OF ONE-HALF TO SIGMUND S. HIRSCHLER, OF SAME PLACE.

COMPOSITION FOR WATERPROOFING TEXTILE MATERIALS.

SPECIFICATION forming part of Letters Patent No. 407,265, dated July 16, 1889.

Application filed June 23, 1888. Serial No. 278,000. (No specimens.)

*To all whom it may concern:*

Be it known that I, JACOB WELTI, a citizen of the Republic of Switzerland, residing at New York, in the county and State of New York, have invented new and useful Improvements in Composition for Waterproofing Textile Materials, of which the following is a specification.

This invention relates to a composition by means of which textile fabrics of silk, wool, cotton, hemp, flax, or other fibrous materials can be rendered water-proof, while at the same time the passage of air through said fabrics is not stopped up.

The composition which forms the subject-matter of my present application for a patent consists of glue, sugar of lead, alum, and water, and these ingredients are mixed together in about the following proportions: Glue, from one-fourth to two parts; sugar of lead, from one to twenty parts; alum, from one to twenty parts; water, one hundred parts—that is to say, if my composition is to be used for linen fabrics I take about one and one half pound of glue, about fifteen pounds of sugar of lead, and about fifteen pounds of alum and dissolve these ingredients in one hundred pounds of water. For cotton or woolen fabrics, or for fabrics made partly of wool and partly of cotton or other fibers, known as "mixed fabrics," the proportion must be changed, as will be readily found out by experience. After the compound has been prepared in the manner above described, I immerse the fabric to be treated in the solution a sufficient length of time to produce the desired effect, the length of time being dependent upon the nature of the fabric and its color.

What I claim as new, and desire to secure by Letters Patent, is—

A waterproofing composition consisting of glue, sugar of lead, alum, and water, substantially as herein described.

In testimony whereof I have hereunto set my hand in the presence of two subscribing witnesses.

JACOB WELTI.

Witnesses:
W. C. HAUFF,
E. F. KASTENHUBER.